(12) United States Patent
Dang

(10) Patent No.: US 8,537,895 B2
(45) Date of Patent: *Sep. 17, 2013

(54) METHOD AND APPARATUS FOR PARALLEL PROCESSING OF IN-LOOP DEBLOCKING FILTER FOR H.264 VIDEO COMPRESSION STANDARD

(75) Inventor: Philip P Dang, San Diego, CA (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,119

(22) Filed: Jan. 13, 2012

(65) Prior Publication Data

US 2012/0189067 A1    Jul. 26, 2012

Related U.S. Application Data

(63) Continuation of application No. 11/233,448, filed on Sep. 22, 2005, now Pat. No. 8,116,379.

(60) Provisional application No. 60/617,001, filed on Oct. 8, 2004.

(51) Int. Cl.
*H04N 7/12* (2006.01)

(52) U.S. Cl.
USPC ............. 375/240.12; 375/240; 375/240.01; 375/240.29; 375/240.24; 382/239; 382/268

(58) Field of Classification Search
USPC ............. 375/240, 240.01, 240.12, 240.29; 382/239, 268, 266, 261
See application file for complete search history.

(56) References Cited

U.S. PATENT DOCUMENTS 7,457,362 B2    11/2008    Sankaran

OTHER PUBLICATIONS

Dang, An Efficient Implementation of In-Loop Deblocking Filter Standard for H.264 Using VLIW Architecture and Predication, PowerPoint presentation, IEEE International Conference on Consumer Electronics, Las Vegas, NV, Jan. 10-12, 2005, pp. 33.
Richardson, H.264 / MPEG-4 Part 10: White Paper—Overview of H.264, www.vcodex.com, Jul. 10, 2002, pp. 8.
Lainema, et al., The Next Generation of Video Coding: MPEG-4 AVC, online article, www.nokia.com, May 17, 2004, pp. 4
Legall, H.264 Delivers Twice-As-Good Compression and Enhanced Quality. Video Compression's Quantum Leap, www.edn.com, Dec. 11, 2003, pp. 4.
H.261/MPEG 4 AVC, From Wikipedia, the free encyclopedia, http://enwikipedia.org, Aug. 25, 2005, pp. 6.

*Primary Examiner* — Kim Vu
*Assistant Examiner* — Ruiping Li
(74) *Attorney, Agent, or Firm* — Hogan Lovells US LLP

(57) ABSTRACT

A parallel deblocking filtering method, and deblocking filter processor performing such deblocking, for removing edge artifacts created during video compression. The method includes loading luma samples for a macroblock. Filtering is performed on a set of vertical edges of the macroblock using information in the luma samples, with vertical edge filtering occurring concurrently with the loading of the luma samples. The method also includes filtering a set of horizontal edges of the macroblock using information in the luma samples. The horizontal edge filtering occurs in parallel with vertical edge sampling and with loading operations. The use of parallel and concurrent operations significantly enhances the efficiency of the deblocking method. Storing of filtered samples is also performed in the method, and this storing is performed concurrently with some loading operations as well as filtering operations. Edge filtering includes performing filtering to the H.264 standard and its deblocking filtering algorithm.

28 Claims, 10 Drawing Sheets

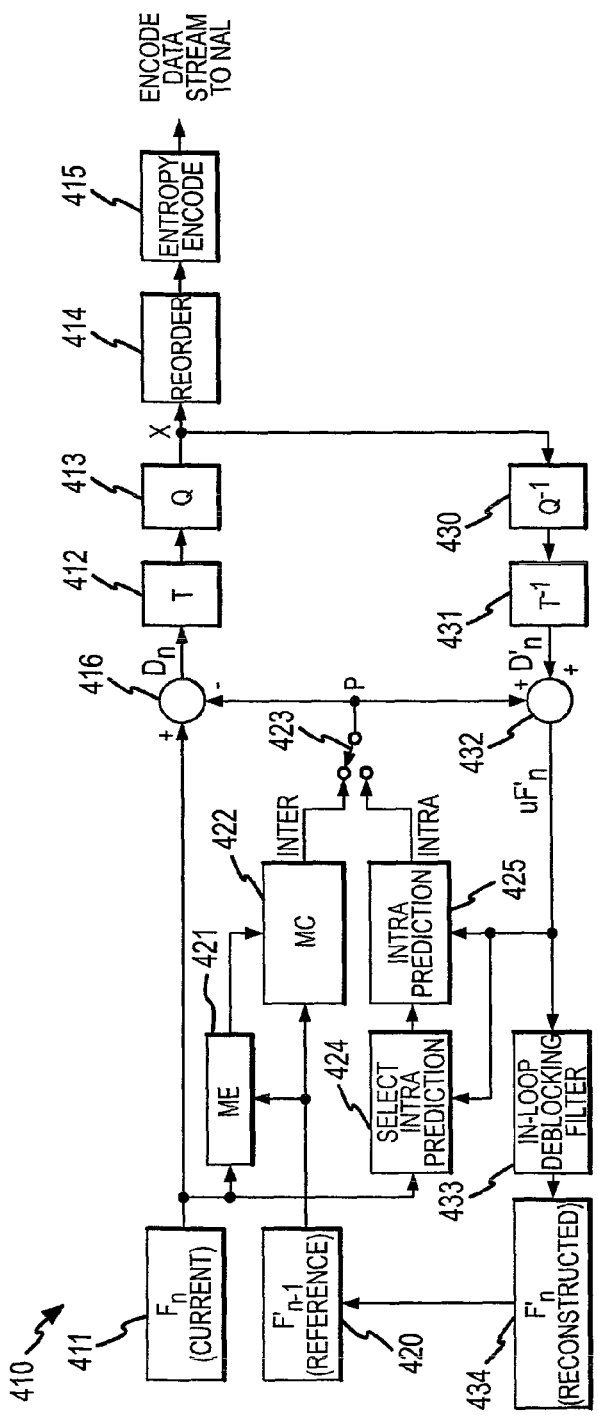
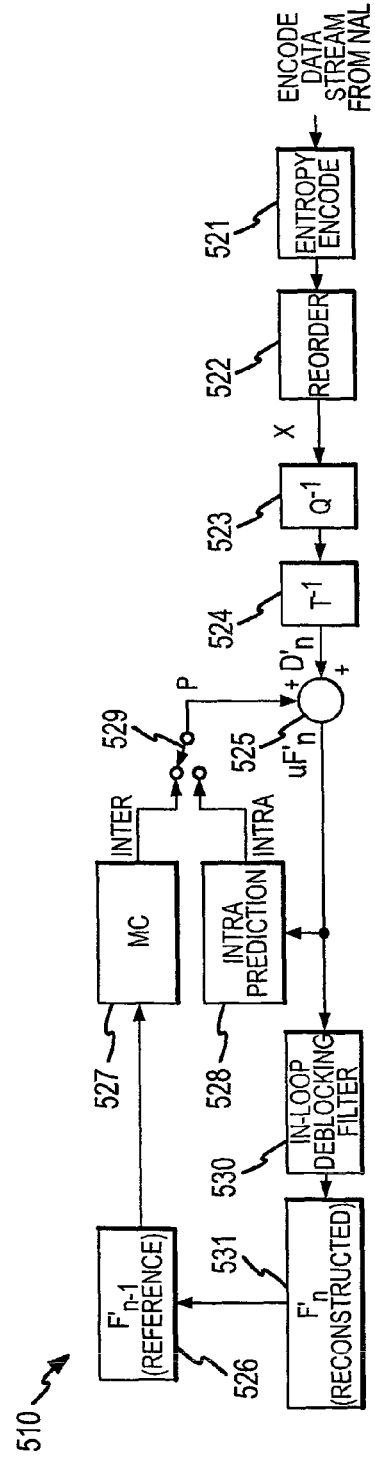
FIG.4
FIG.5

METHOD AND APPARATUS FOR PARALLEL PROCESSING OF IN-LOOP DEBLOCKING FILTER FOR H.264 VIDEO COMPRESSION STANDARD

RELATED APPLICATIONS

The present invention is a continuation of U.S. patent application Ser. No. 11/233,448 filed Sep. 22, 2005, which claims the benefit of U.S. Provisional Application No. 60/617,001, filed Oct. 8, 2004, both of which are incorporated herein by reference in their entireties.

BACKGROUND OF THE INVENTION

1. Field of the Invention

The present invention relates generally to video compression and filter and filtering methods used in video compression, and more particularly, to a deblocking filter and method (and devices incorporating such a filter or performing such a method) that provides an in-loop filter implementation of the deblocking filter algorithm of the H.264/MPEG-4 AVC high compression digital video CODEC standard that is adapted for parallel processing and predication using the VLIW processing architecture.

2. Relevant Background

Advances in video compression techniques have revolutionized the way and places video information is communicated and displayed. Applications that use video compression include broadcast television and home entertainment including high definition (HD) television and other forms of video devices including those that are adapted for exchanging digital video information and especially those that call for high-definition picture resolutions such as computers, DVD players, gaming consoles and systems, wireless and cellular devices. These applications and many more are made possible by the standardization of video compression technology. To address limitations in prior standards, video coding experts in the International Telecommunications Union—Telecommunication (ITU-T) and the Moving Picture Experts Group (MPEG) have produced a new video compression standard that defines the syntax of an encoded video bit stream together with the method of decoding this bit stream but without explicitly defining a CODEC (encoder/decoder pair) which allows considerable variation in implementing the standard in working devices. The new standard is labeled H.264 or MPEG-4 AVC (Advanced Video Coding).

Generally, compression allows video content to be transferred and stored using much lower data rates while still providing desirable picture quality, e.g., providing relatively pristine video at low data rates or at rates that use less bandwidth. To this end, compression identifies and eliminates redundancies in a signal to produce a compressed bit stream and provides instructions for reconstituting the bit stream into a picture when the bits are uncompressed. Video compression techniques today follow a common set of steps. Video compression involves segmenting a video frame into blocks of pixels. An estimate is made of frame-to-frame motion of each block to identify temporal or spatial redundancy within the frame. An algorithmic transform decorrelates the motion-compensated data to produce an expression having a low number of coefficients to reduce spatial redundancy. Then, the frequency coefficient is quantized based on psycho-visual redundancy to reduce the average number of bits necessary to represent the compressed video.

Video compression techniques may introduce artifacts or discontinuities that need to be filtered or corrected to decode the compressed video to near its original state. Most video compression standards, including the new H.264, divide each input field or frame into blocks and macroblocks of fixed size. Pixels within these macroblocks are considered as a group without reference to pixels in other macroblocks. Compression may involve transformation of the pixel data into a spatial frequency domain, such as via an integer transform. This frequency domain data is quantized and encoded from low frequency to high frequency. Since much of the energy in the frequency domain data is usually concentrated in the low frequencies, an end of block symbol enables truncation of coding high frequency symbols. The resulting quantized data is typically entropy coded. In entropy coding more frequently used symbols are coded with fewer bits than less frequently used symbols. The net result is a reduction in the amount of data needed to encode video. This coding in separate macroblocks can create coding artifacts at the block and macroblock boundaries. Because adjacent macroblocks may be encoded differently, the image may not mesh well at the macroblock boundary. For example, other features of the macroblock may cause a different quantization parameter. Upon decoding, the same color or gray-scale value at the macroblock boundary may be displayed differently based upon this different quantization which may appear as block or edge artifacts in the displayed video image.

To eliminate these artifacts, H.264 defines a deblocking method that operates on 16×16 macroblocks and 4×4 block boundaries. In the case of the macroblocks, the deblocking filter eliminates artifacts resulting from motion or intraframe estimation or different quantizer scales. For the 4×4 blocks, the deblocking filter removes artifacts that are caused by transformation/quantization and motion-vector differences between adjacent blocks. Generally, an in-loop filter modifies pixels on either side of the boundary using a content-adaptive, nonlinear filter, with both the encoder and decoder complying with H.264 using the same deblocking filter to provide a "loop." As a result of the use of the deblocking filter, the decoded or de-compressed stream has significantly improved visual quality.

Video compression compliant with H.264 provides a greatly improved rate distortion when compared with prior compression standards, such as MPEG-4, and several studies have indicated that H.264 provides for comparable video quality with MPEG-2 while requiring less than half the bit rate. In order to obtain better compression, H.264 calls for a directional spatial prediction scheme to find more redundancies among pixels within a video frame. For inter coding, H.264 implements multiple frame reference, weighted prediction, a deblocking filter, variable block size, and quarter sample accurate motion compensations. For transformation, H.264 uses a small, block-based integer and hierarchical transform. For entropy coding, H.264 adopts two coding techniques (i.e., context adaptive based arithmetic coding for the main profile and context adaptive variable length coding for baseline, main, and extended profiles. From the high level architectural viewpoint, the H.264 coding scheme is similar to the architectures of other video CODECs. However, the basic functional blocks of H.264, such as prediction, transformation, quantization, and entropy coding are significantly different than those in prior video coding schemes. As a result, hardware designed to comply with prior video compression standards is not compatible with H.264 and cannot be used to implement this new compression standard. As a result, new implementations of software and/or hardware are required code video streams according to H.264.

While providing a lower bit rate, there are implementation problems associated with the H.264 standard as its computational complexity is relatively high. From recent studies and research, it appears that real-time implementations of H.264 may require a powerful processor multiple processors and two level caches and special memory interfaces. Some early proposed video processing systems involved multicore architectures that included one MIPS processor and eight 600 MHz Trimedia processors that each had three level caches. Such implementations are likely not cost effective and may not be suited for mainstream consumer electronics, and there remains a need for effective implementations of H.264 before it will be readily adopted and used by consumers.

Particularly, there is a need for a hardware solution for efficiently implementing a deblocking filter complying with the requirements of H.264. The deblocking filter plays an important role in H.264 video compression. It is used to reduce blocking artifacts that are created during the motion compensation process and/or by the coarse quantization of transform coefficients. The deblocking filter is an advanced tool of the H.264 standard used to maximize the coding performance. Loop or in-loop filters that operate within the coding loop have been shown by empirical testing to significantly improve both objective and subjective quality of video streams compared with post filters, and as a result, in-loop filters are likely to be used to implement the H.264 deblocking filter. Unfortunately, in-loop or loop filters increase computational complexity for both an encoder and a decoder that may be implemented to comply with H.264. Research has shown that even with tremendous speed optimization, the deblocking filter process or algorithm specified by H.264 may consume about one third of the processor time of a software implementation of the H.264 decoder.

Hence, there remains a need for an efficient implementation of an in-loop deblocking filter complying with the H.264 video compression standard. Preferably, such a filter and associated filtering process would be adapted or designed to significantly reduce the amount of processor time consumed during deblocking while being useful with existing processor architectures, such as the very long instruction word (VLIW) architecture.

SUMMARY OF THE INVENTION

The present invention addresses the above problems by providing an efficient deblocking filtering method and deblocking processor that are compliant with or that implement the deblocking filter described in the H.264 video compression standard. The proposed method are based on implementations using very long instruction word (VLIW) processor architectures with data parallelism and pipelined architectures for deblocking filter components being used to accelerate performance. Briefly, the method and deblocking filter of the invention reduce the number of memory accesses by using a set of vector registers useful for storing or holding 4×4 blocks of a macroblock, which eliminates the needs for a memory intensive transpose operation. Improvements are also provided by mapping the H.264 deblocking filter algorithm into a multi-stage pipeline architecture that is implemented using the VLIW architecture to facilitate performing macroblock data loads, filtering of vertical edges, filtering of horizontal edges, and storing of deblocked or processed data in parallel, concurrent operations (e.g., up to four operations being performed concurrently by 4-way VLIW processor). Branch condition penalties associated with the H.264 deblocking filter algorithm are also reduced by efficiently calculating guard conditions that are used in edge deblocking decisions and used by filtering processes (such as strong edge deblocking).

More particularly, a deblocking filtering method is provided for removing edge or boundary artifacts created during video compression operations. The method includes loading, with a deblocking filter processor, a set of luma samples for a macroblock. Filtering is performed on a set of vertical edges of the macroblock using information in the loaded set of luma samples, with vertical edge filtering occurring concurrently or partially concurrently with the loading of the luma samples (i.e., after sufficient samples are loaded, filtering occurs concurrently with additional loading operations). The method also includes filtering a set of horizontal edges of the macroblock using information in the loaded set of luma samples. The horizontal edge filtering typically overlaps with or happens in parallel with vertical edge sampling and with loading operations. The use of parallel and concurrent operations significantly enhances the efficiency of the deblocking method. Storing of filtered samples is also performed in the method, and this storing is performed concurrently with some loading operations as well as filtering operations. The luma samples may be made of 4×4 blocks and the loading of the set of luma samples may include loading the 4×4 blocks in vector registers provided in the deblocking filter processor. The filtering of the vertical and horizontal edges includes performing filtering to the H.264 standard as defined in a deblocking filtering algorithm including processing of edges in differing manners based on the boundary strength of each edge.

According to another aspect of the invention, a deblocking filter is provided for implementing deblocking filtering under the H.264/AVC video compression standard. The filter includes a set of vector registers for storing blocks of a macroblock (such as 4×4 blocks). A first filtering unit is provided for filtering vertical edges of the blocks, and a second filtering unit is provided for filtering horizontal edges of the blocks. The first and second filtering units operate at least during some operations steps of the filter to concurrently perform the filtering of vertical and horizontal edges using data for the blocks fed directly from the vector registers (rather than requiring system memory accesses). The deblocking filter may be provided as a VLIW processor that operates to perform the storing of the blocks in the vector registers and the filtering of the vertical and horizontal edges at least partially concurrently. Further, the VLIW processor may act as 4-way processor by also storing results of the vertical and horizontal filtering in system memory and such storing can be done concurrently with loading of block data, with vertical edge filtering operations, and/or with horizontal edge filtering operations.

BRIEF DESCRIPTION OF THE DRAWINGS

FIG. 4 is a block diagram of an AVC encoder (or encoding process) compliant with H.264 including an in-loop deblocking filter (of filtering process) according to the present invention;

FIG. 5 is a block diagram of an AVC decoder (or decoding process) compliant with H.264 including an in-loop deblocking filter (or filtering process) according to the present invention;

DETAILED DESCRIPTION OF THE PREFERRED EMBODIMENTS

Figures 1, 2:
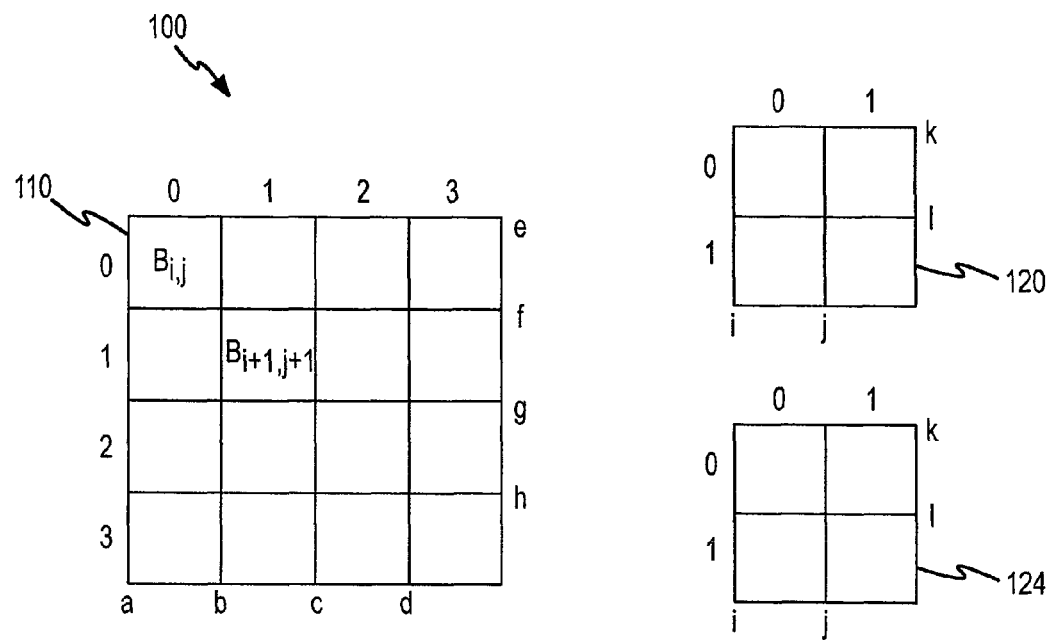
FIG. 1 illustrates video data as represented in H.264 including a luma macroblock component and two chroma components.
FIG. 2 illustrates another representation of the luma component of a macroblock.

The present invention is directed to providing an architecture of a high performance coprocessor to implement a deblocking filter that functions in compliance the H.264 video compression standard, which defines a deblocking algorithms without requiring a particular implementation. From the inventor's design analysis, there are three main reasons that a H.264-compliant deblocking filter may consume significant amounts of processor or CPU time. First, deblocking filtering requires lots of memory access. In a general-purpose processor, in order to perform the H.264 deblocking filter operation, the CPU must load data for horizontal filtering, store the intermediate results, and then, reload data again for vertical filtering. These operations require numerous memory accesses. Second, the deblocking filtering by itself is an intensive computational process. In H.264, except for some special conditions, the deblocking algorithm must be applied on all the boundaries of all 4×4 blocks and macroblocks, and this process requires many computations. Third, branch conditions frequently occur in the adaptive deblocking algorithm of the H.264. These conditional branches cause many cycle delays since the processor must put variables into, and later pop them from the memory stack. Together, these three operational areas provide the causes H.264 deblocking filtering consumes significant amounts of CPU time.

Generally, the deblocking filter process of the invention is designed based on the very long instruction word (VLIW) architecture, with the VLIW processor being able to issue and execute several instructions in parallel such that the deblocking filter process can include (at least at some operational points) four operations being processed in parallel. To reduce the branch prediction penalty, a predication technique is implemented in the VLIW processor. The basic idea or concept is that all possible code branches are executed in parallel before the branch condition is verified (i.e., speculative execution).

The deblocking filter and filtering method of the present invention addresses each of these processor intensive operations. First, to minimize the latency due to memory accessing, video processors of the present invention are provided access to a set of vector registers that are adapted to hold several 4×4 blocks. The benefits of providing such registers in memory are two fold. It reduces the number of load/store operations. Note, a video frame is two-dimensional data. Without the use of these vector registers, after the horizontal filtering, a transpose operation must be applied to transfer data from rows to columns prior to the vertical filtering process. The proposed architecture using vector registers eliminates the need for the transpose operation, which reduces latency. Second, data from these vector registers can be fed directly into two execution units (i.e., a horizontal and a vertical filtering or execution unit) where the vertical and horizontal deblocking filters of different blocks of data can be processed concurrently. Additionally, permutation instructions are provided that are designed to help each execution unit select appropriate data for processing.

FIG. 1 illustrates H.264 data 100 in the form of a H.264 macroblock (MB) 110 and two aroma samples 120, 124. To address the second issue associated with implementing an H.264 deblocking filter, the present invention calls for mapping of the deblocking filter algorithm into a multi-stage pipeline architecture. For each macroblock 110, the video processor will first activate the vertical execution unit and perform deblocking process for the vertical edges of four 4×4 blocks in the left column of the macroblock 110. Next, the processor deblocks the vertical edges of the top 4×4 block in the next column. After both vertical edges $a_0$ and $b_0$ of the first block $B_{ij}$ are processed, the horizontal execution unit is activated, and it starts the deblocking process for the horizontal edge $e_0$ of $B_{ij}$ in the next cycle. At the same time, the vertical execution unit processes edge $b_1$. Both execution units continue until edge $h_3$ is completed. In other words, for each MB 110, filters are first applied on four vertical edges (a, b, c, and d) of the luma sample. After that, four horizontal edges (e, f, g, and h) are filtered. Similar processes are applied for two horizontal edges and two vertical edges of each chroma sample 120, 124. Thus, the filtering of the horizontal edges is performed at least partially concurrently with the filtering of the vertical edges for a horizontal edge using only luma samples used previously in the filtering of one or more vertical edges. Note, however, that not all MBs are filtered as the H.264 deblocking filter algorithm contains several parameters that check the possibility if there are edges between two 4×4 blocks. If these conditions are met, the filtering process is applied and if not the MBs are sent to the reference frames. The use of these parameters is discussed in more detail below. Additionally, the H.264 video processor of the present invention is designed as a 4-way VLIW processor, and it can execute one load, one store, and two arithmetic operations per VLIW instruction. With these combination of features, the throughput of the video processing system of the invention is significantly increased.

FIG. 2 illustrates a macroblock 210 with the edges of the luma component numbered differently than in FIG. 1 for clarity in the following description of the proposed pipeline deblocking scheme. From the design analysis, it was clear to the inventor that in order to accelerate the performance of a deblocking filter providing the functions called for in H.264, the filter process should be designed to reduce the number of memory accesses. Additionally, the filter process and filter should be configured to minimize the delays and penalties due to branch conditions. In addition, since parallel processing using the SIMD approach does not work for deblocking filtering, the invention provides an deblocking filter architecture based on VLIW techniques that fit well for the H.264 deblocking filter algorithm. With these objectives in mind, the invention provides a new pipeline deblocking scheme that reduces the number of memory accesses required and allows calculating of the deblocking operations in-place.

FIG. 2 depicts the edges in a luma component of a macroblock 210. There are 16 vertical edges and 16 horizontal edges, which are numbered from 0 to 16. The proposed pipeline deblocking scheme can generally be described as follows (with "n" being the edge number):

For $0=n<5$, deblocking vertical edges $V_n$;

For $5 \leq n \leq 15$, concurrent deblocking vertical edges $V_n$ and horizontal edges $H_{n-5}$; and For $11 \leq n \leq 15$, deblocking horizontal edges $H_n$.

The motivations behind this proposed method include utilizing the pipeline processing to accelerate the performance of the video processor and reducing the number of memory accesses. The first 5 steps of the proposed scheme are similar to the conventional approach described in the H.264. Then, after the vertical edge numbered "4" is filtered, instead of sending the top left block into memory, the video processor of the invention loads the 4×4 block above it to deblock the horizontal edge $H_0$. At the same time, the processor also filters the vertical edge $V_5$. Next, since data of the block $B_{ij+1}$ are available, the processor filters the horizontal edge $H_1$ concurrently with the vertical edge $V_6$. This process is continued until all vertical edges are filtered, and after that point, the process continues with processing of the remaining five horizontal edges. Alternatively stated, this process involves filtering the left-most vertical edges and the next left-most top vertical edge, filtering a next horizontal edge starting with the top left-most horizontal edge going under and then to the right concurrently with filtering a next vertical edge starting with the vertical edge under the next left-most top vertical edge going under and then to the right iteratively until all vertical edges are filtered, and filtering the remainder of the horizontal edges. The deblocking filtering process is described in greater detail below.

To address the issues related to numerous branch conditions, the deblocking filter process of the invention applies a predication technique to minimize the penalty of the branch operations. Guard conditions are used to ensure appropriate operations are executed without branch prediction penalty. In H.264, during the deblocking process, a processor typically uses information from input data to calculate several parameters such as average quantizer QP, boundary strength Bs, thresholds $\alpha$ and $\beta$, and intermediate thresholds $a_p$ and $a_q$. These parameters are combined with other conditions, such as the change of gradient among pixels in the neighborhood of the edges, to generate control signals. Based on these signals, appropriate filtering techniques are selected for the deblocking process. In a general purpose processor, it takes a lot of cycles to calculate these parameters and control signals. In addition, it also takes many registers to store them for later use. After that, conditional branching is used to select appropriate filtering operations. This technique causes delays due to putting and popping variables on the processor stack. In contrast, in the video processor of the present invention, several datapaths allow all filtering kernels to operate concurrently. A small circuit is provided and designed to calculate deblocking parameters and control signals. The signals are then used as guard conditions to control execution units (e.g., the vertical and horizontal execution units) and help the coprocessor to select the correct outputs.

Figure 3:
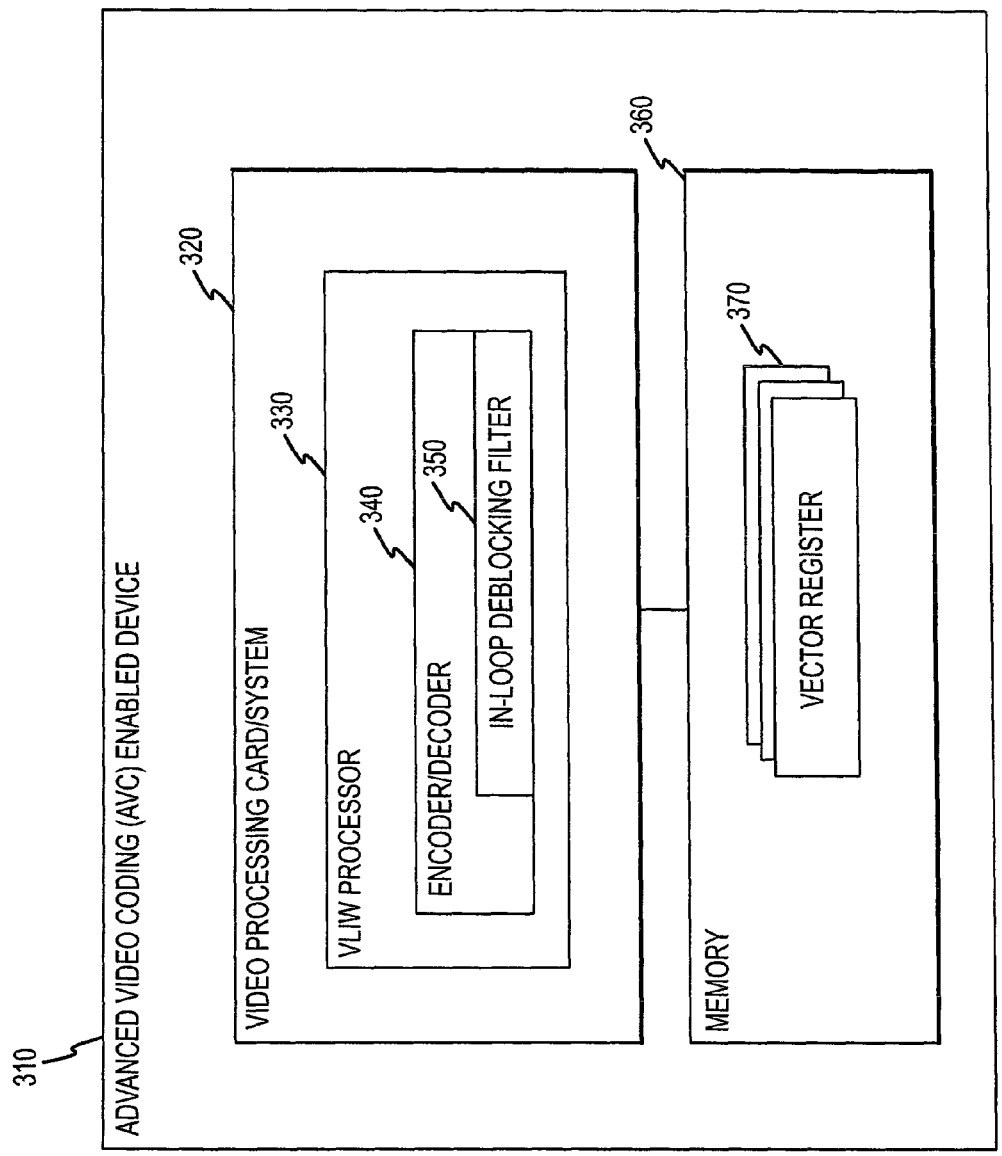
FIG. 3 is a block diagram of an advanced video coding (AVC) enabled device including a video processing card or system that uses an encoder or decoder with an in-loop deblocking filter according to the present invention and provided with a set of vector registers.

As will be appreciated, the present invention is useful in nearly any application in which a deblocking filter is needed to comply with the H.264 compression standard. With this in mind, FIG. 3 illustrates an advanced video coding (AVC) or H.264 enabled device 310, which is intended to represent a video broadcasting system or device, a video recording device or any other device used to encode video in an encoded data stream according to H.264 and also to represent any device used to decode and use an input video data stream that has been encoded to H.264, such as an HD DVD player, a personal computer (e.g., one with high resolution video playback), wireless or cellular communication devices with video capabilities, graphics processing units, video game consoles, and the like. The AVC-enabled device 310 includes a video processing card (e.g., a graphics card) or system 320 and memory 360. The video processing card 320 includes a very long instruction word (VLIW) processor 330 that is configured as an AVC encoder or decoder 340 (as indicated by the functionality of the AVC-enabled device to encode or to decode a video data stream). The encoder or decoder 340 includes an in-loop deblocking filter 350 configured according to the present invention. To reduce the number of memory accesses required during operation of the filter 350, the memory 360 includes a set of vector registers 370 that are configured to store several 4×4 blocks for processing.

FIGS. 4 and 5 illustrate an AVC encoder 410 and decoder 510 that are compliant with the H.264 standard and that include in-loop deblocking filters 433 and 530 according to the present invention. Encoder 410 begins with the nth frame Fn at 411. Frequency transform block 412 transforms a macroblock (MB) of the pixel data into the spatial frequency domain. This typically involves an integer transform, and the frequency domain data is then quantized in quantization block 413 to provide resultant X. Quantization typically takes into account the range of data values for the current macroblock (MB) with differing macroblocks often having differing quantizations. Per the H.264 standard, in the base profile, the macroblock data may be arbitrarily reordered via reorder block 414. The quantized data is encoded by entropy encoding block 415, which may employ fewer bits to encode more frequently used symbols and more bits to encode less frequency used symbols. This process reduces the amount of encoded that must be transmitted and/or stored. The resulting entropy encoded data is the encoded data stream that is transmitted to the NAL (Network Abstraction Layer).

The H.264 video compression standard permits two types of predictions. In inter-frame prediction, data is compared with data from the corresponding location of another frame. In intra-frame prediction, data is compared with data from another location in the same frame. For inter-frame prediction, data from n–1th frame $F_{n-1}$ 420 and data from the current frame $F_n$ 411 supply motion estimation block 421. Motion estimation block 421 determines the positions and motion vectors of moving objects within the picture. This motion data is supplied to motion compensation block 422 along with data from frame $F_{n-1}$ 420. The resulting motion compensated frame data is selected by switch 423 for application to subtraction unit 416. Subtraction unit 416 subtracts the inter prediction data from switch 423 from the input frame data from current frame $F_n$ 101. Thus, frequency transform block 412, quantization block 413, reorder block 414, and entropy encoding block 415 encode the differential data rather than the original frame data. Assuming there is relatively little change from frame to frame, this differential data has a smaller magnitude than the raw frame data. This can be expressed in fewer bits contributing to data compression even if motion estimation block 421 and motion compensation block 422 find no moving objects to code. If the current frame $F_n$ and the prior frame $F_{n-1}$ are identical, the subtraction unit 416 produces a string of zeros for data that can be encoded using few bits.

The second type of prediction is intra prediction, which predicts a macroblock (MB) of the current frame from another macroblock of that frame. Inverse quantization block 430 receives the quantized data from quantization block 413 and substantially recovers the original frequency domain data. Inverse frequency transform block 431 transforms the frequency domain data from inverse quantization block 430 back to the spatial domain. This spatial domain data supplies one input of addition unit 432. Encoding process 410 includes select intra predication unit 424 to determine whether to implement intra prediction. Select intra prediction unit 424 receives data from current frame $F_n$ 411 and the output of addition unit 432 and in response, signals intra prediction intra predication unit 425, which also receives the output of addition unit 432. Switch 423 selects the intra prediction output for application to the subtraction input of subtraction units 416 and an addition input of addition unit 432. Intra prediction is based upon the recovered data from inverse quantization block 430 and inverse frequency transform block 431 in order to better match the processing at decoding. If the encoding used the original frame, there might be drift between these processes resulting in growing errors. Encoding process 410 includes reconstruction of the frame based upon this recovered data. The output of addition unit 432 supplies in-loop deblocking filter 433. In-loop deblocking filter 433 smoothes artifacts created by the block and macroblock nature of the encoding process as described in detail below. The result is reconstructed frame $F'_n$ 124. As shown, this reconstructed frame $F'_n$ 434 becomes the next reference frame $F_{n-1}$ 420.

FIG. 5 illustrates a decoder or decoding process 510 implementing H.264 and using an in-loop deblocking filter 530 according to the present invention (which is identical or similar to filter 433). Entropy decode unit 521 receives the encoded data stream for the NAL. Entropy decode unit 521 recovers the symbols from an entropy encoding of entropy encoding unit (such as unit 415 of FIG. 4). Reorder unit 522 assembles the macroblocks (MBs) in raster scan order reversing the reordering of the encoder's reorder unit (such as unit 104). Inverse quantization block 523 receives the quantized data from reorder unit 522 and recovers the original frequency domain data. Inverse frequency transform block 524 transforms the frequency domain data from inverse quantization block 523 back to the spatial domain. This spatial domain data supplies one input of addition unit 525. The other input of addition input 525 comes from switch 529. In inter-frame mode, switch 529 selects the output of motion compensation unit 527. Motion compensation unit 527 receives the reference frame $F'_{n-1}$ 526 and applies the motion compensation computed by motion compensation unit (such as unit 422) and transmitted in the encoded data stream.

Switch 529 may also select intra-frame prediction. The intra-frame prediction is signaled in the encoded data stream. If this is selected, intra prediction unit 528 forms the predicted data from the output of adder 525 and then applies the intra prediction computed by intra prediction block of the encoder (such as block 425 of the encoding process 410). Addition unit 525 recovers the predicted frame. The output of addition unit 525 supplies the input of the in-loop deblocking filter 530 configured according to the present invention. In-loop deblocking filter 530 smoothes artifacts created by the block and macroblock nature of the encoding process as discussed in detail below. The result is reconstructed frame $F'_n$ 531. As shown, this reconstructed frame $F'_n$ 531 becomes the next reference frame $F'_{n-1}$ 526.

Prior to describing the operation of a deblocking filter of the invention, it may be useful to further describe generally operation of such a filter according to H.264 and describe the deblocking algorithm. A filter is applied to every decoded macroblock to reduce blocking distortion. The deblocking filter is applied after the inverse transform in the encoder (before reconstructing and storing the macroblock for future predictions) and in the decoder (before reconstructing and displaying the macroblock). The deblocking filter smooths block edges and improves the appearance of the decoded image. The filtered macroblock is used for motion compensated prediction in the encoder, which results in smaller residuals after prediction and provides better coding efficiency. However, there are several disadvantages to using a deblocking filter including requiring more computations, increasing the number of memory accesses, and increasing the overall computational complexity.

With reference to FIG. 1, filtering under H.264 is applied to the macroblock 110 by filtering 4 vertical edges a, b, c, d of the luma component and then filtering 4 horizontal edges e, f, g, h of the luma component. Deblocking filtering continues with filtering 2 vertical edges i, j of each chrom component 120, 124 and then, filtering horizontal edges k, l of each chroma component 120, 124. Each filtering operation affects up to three pixels on either side of the edge or boundary. Depending on the current quantizer, the coding modes of neighboring blocks and the gradient of image samples across the edge or boundary, several outcomes are possible including filtering no pixels to filtering three pixels on either side of the vertical or horizontal edge or boundary (e.g., sampling of pixels in $\{p_2, p_1, p_0, q_0, q_1, q_2\}$).

The choice of filtering outcome depends upon the boundary strength (Bs) and on the gradient of image samples across the edge or boundary. In other words, a subset of pixels in the set of $\{p_2, p_1, p_0, q_0, q_1, q_2\}$ is filtered only if boundary strength Bs is greater than zero and the absolute value of each of $p_0$-$q_0$, $p_1$-$p_0$, and $q_1$-$q_0$ is less than thresholds $\alpha$ and $\beta$, with these two thresholds being defined in the H.264 compression standard and the Bs being calculated based on several input conditions (as discussed in detail below with respect to the boundary strength unit of the VLIW process configured for providing the deblocking filter functions of the present invention).

The choice of filtering outcome depends on the boundary strength and on the gradient of image samples across the boundary. The boundary strength Bs is chosen or calculated according to the following rules: (1) when p or q is intra coded and boundary is a macroblock boundary then Bs=4 (strongest filtering); (2) when p or q is intra coded and boundary is not a macroblock then boundary Bs=3; (3) when neither p or q is intra coded and p or q contain coded coefficients then Bs=2; (4) when neither p or q is intra coded, neither p or q contain coded coefficients, and p and q have different reference frames or a different number of reference frames or different motion vector values then Bs=1; and (5) when neither p or q is intra coded, neither p or q contain coded coefficients, and p and q have same reference frame and identical motion vectors then Bs=0 (no filtering). As can be seen, the filter is stronger where there is likely to be significant blocking distortion, such as the boundary of an intra coded macroblock or a boundary between blocks that contain coded coefficients.

The H.264 deblocking filtering algorithm can then be stated as follows:

| Filter | Input | Output |
|---|---|---|
| When Bs = 0, then no filtering. | | |
| When Bs = 1, 2, or 3: | | |
| 4-tap | $p_1, p_0, q_0, q_1$ | P0 |
| 4-tap | $p_1, p_0, q_0, q_1$ | Q0 |
| If $\lvert p_2-p_0 \rvert < \beta$: | | |
| 4-tap | $p_2, p_1, p_0, q_1$ | P1 |
| If $\lvert q_2-q_0 \rvert < \beta$ | $p_0, q_0, q_1, q_2$ | Q1 |
| When Bs = 4: | | |
| If $\lvert p_2-p_0 \rvert < \beta$ and $\lvert p_0-q_0 \rvert < (\alpha/4)$: | | |
| 5-tap | $p_2, p_1, p_0, q_0, q_1$ | P0 |
| 4-tap | $p_2, p_1, p_0, q_0$ | P1 |
| 5-tap | $p_3, p_2, p_1, p_0, q_0$ | P2 |
| Else: | | |
| 3-tap | $p_1, p_0, q_0$ | P0 |
| If $\lvert q_2-q_0 \rvert < \beta$ and $\lvert p_0-q_0 \rvert < (\alpha/4)$: | | |
| 5-tap | $p_1, p_0, q_0, q_1, q_2$ | Q0 |
| 4-tap | $p_0, q_0, q_1, q_2$ | Q1 |
| 5-tap | $p_0, q_0, q_1, q_2, q_3$ | Q2 |
| Else: | | |
| 3-tap | $p_1, q_0, q_1$ | Q0 |

In implementing the H.264 deblocking filtering algorithm, there are a number of design issues including high numbers of memory accesses. Additionally, there are data dependencies among pixels that can require extra memory or buffers to store intermediate results and further increase number of memory accesses. Further, the algorithm is written to require conditional jumps or conditions that need to be checked before filtering each block, and in DSP and general purpose processors, condition branches decrease the system throughput. To address these issues, the inventor selected a design that reduces the number of memory accesses, minimizes the delay and penalty associated with branch conditions, and accelerates the performance through parallel processing techniques. The solution (i.e., deblocking filter (DBF) and method) described herein provides a new pipeline processing scheme, introduces a VLIW processing approach, and also provides an exemplary embodiment of an application specific processor for H.264 DBF operation (i.e., see FIG. 6). As will be seen the proposed architecture provides pipelined processing, can be implemented with a regular architecture, provides for in-place deblocking operations, and provides high performance throughput in part by significantly reducing memory accesses.

A number of hardware implementations may be used to practice the proposed solution of more effectively providing a DBF. Generally, the hardware may include vector registers to reduce memory accesses (e.g., 28-32-bit registers). Two separate filtering units may be used to filter vertical and horizontal edges. Additionally, the hardware may generally include two permutation units, two load units, and one store unit. Preferred embodiments utilize a very long instruction word (VLIW) processor that can issue four 32-bit instructions in a single cycle and can execute four instructions in parallel. Exemplary VLIW instruction format may be: [LD, LD, ALU, ALU], [LD, ALU, ALU, SD], [ALU, ALU, SD, SD], and [LD, LD, ALU, SD]. With an VLIW Assembly code example taking the form: [LW R0, @(P0 !+4); LW R1, @(P1 !+16); ADD R2, R3, R1; ADD R10, R10, R12], [LW R0, @(P0 !+128); SUB R2, R0, R1; ADD R10, R10, R12; SW @(P2 !+4), R2], [SUB R2, R0, R1; ADD R10, R10, R12; SW @(P2 !+4), R2; SW @(P3 !+4), R0], and the like.

Preferred embodiments address branching issues through the use of a predication approach for the DBF. In general purpose processors, when a branch condition happens, the processor puts current variables on the stack, saves the address and a program counter (PC). The processor then executes new instructions and completes a new routine. The processor has to then pop variables from the stack and load the saved address and PC before it can continue previous work. Such processing of branch conditions decreases the performance of the processor, and in H.264 processing, branch conditions happen frequently causing the DBF algorithm to consume a lot of processor or CPU time in general purpose processors. To address these concerns, embodiments of the invention uses a predication technique to increase the performance of branch prediction. The predication technique is implemented using explicitly parallel instruction computing with all possible code branches being executed in parallel before the branch condition is proved (see, for example, discussion of processor for determining guard conditions for predictions below).

Figure 6:
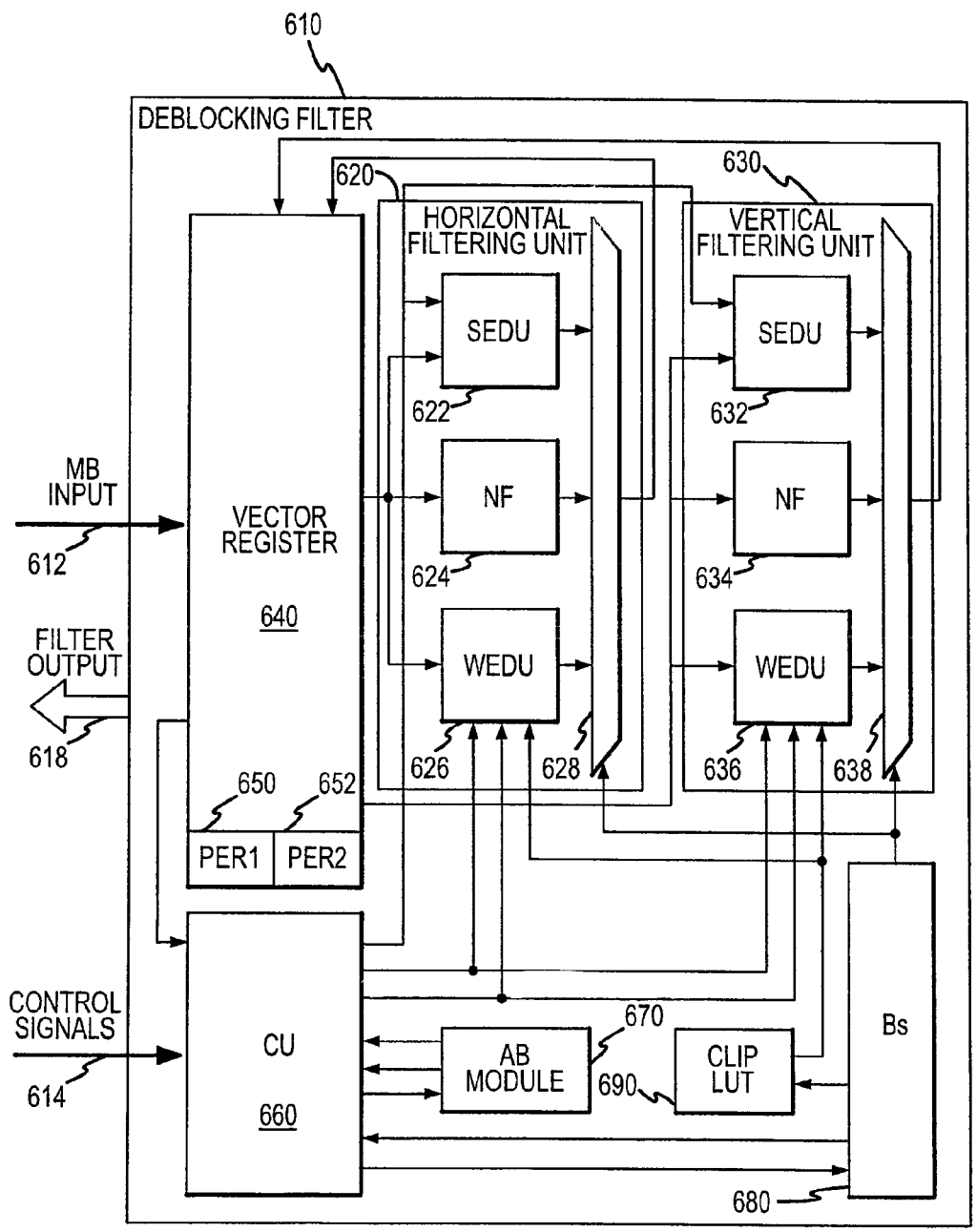
FIG. 6 illustrates in block form the top level architecture of a deblocking processor or deblocking filter according to an embodiment of the present invention.

FIG. 6 illustrates an exemplary deblocking processor or filter 610 shown to illustrate generally the input signals, the filter output (which may be considered a value(s) in system memory rather than an output signal), and functional components of the filter architecture. The deblocking filter 610 may be implemented in AVC enabled devices and systems (as shown with VLIW processor 330 in FIG. 3) and in encoders and decoders (as shown at in-loop deblocking filters 433, 530 in FIGS. 4 and 6). Such a deblocking filter or coprocessor 610 may readily be implemented for H.264 applications, such as digital TV, HDTV, HD DVD players, DVR (playback), portable multimedia players, set-top boxes, and the like and may be provided in encoder and decoder chips (i.e., as the H.264 deblock portion of image reconstruction in a decoder to provide video output used by a graphics display system or device).

The deblocking filter 610 takes in macroblock input 612 (e.g., a macroblock of decoded samples) from system memory (not shown in FIG. 6) and control signals 614 that may include macroblock prediction mode information (intra, inter, or I_PMC), motion vectors, quantization parameters, deblocking filter syntax elements, disable blocking variables, and filter offsets (A and B). The filter "output" 618 includes filtered sample values of the decoded picture, which may be achieved by operation of the deblocking filter on values/data in system memory (not shown in FIG. 6).

According to one important feature of the invention, the deblocking filter 610 includes two sets of filtering units. A horizontal filtering unit 620 is provided for filtering vertical edges (or for horizontal filtering), and a vertical filtering unit 630 is provided for filtering horizontal edges (or for vertical filtering). Each filtering unit 620, 630 includes a strong edge deblocking unit (SEDU) 622, 632, a non-filtering unit 624, 634, a weak edge deblocking unit (WEDU) 626, 636, and a selector 628, 638 for choosing which of these filtering modes or units are employed by the deblocking filter 610 in response to input from boundary strength unit 680 (i.e., a device for determining the Bs based on input from control unit 660 and data in look up table 690).

Additionally, the deblocking filter 610 includes a vector register 640 configured for holding at least several 4×4 blocks to reduce the need for memory accesses. In one implementation, for example, twenty-eight 32-bit registers are provided as vector registers 640. The filter 610 further includes two permutation units 650, 652, a control unit (CU) 660, an alpha-beta generator or module (AB module) 670, and a look up table (CLIP LUT) 690. These components work in conjunction to provide the deblocking filtering operations discussed in the prior description of the efficient deblocking filter algorithm for performing deblocking according to H.264. Varying implementations may be used to provide the desired function of each block or component of filter 610, with the following described microarchitectures of these components of filter 610 being provided for exemplary and illustrative purposes only of one useful technique for achieving the filter 610.

Figure 7:
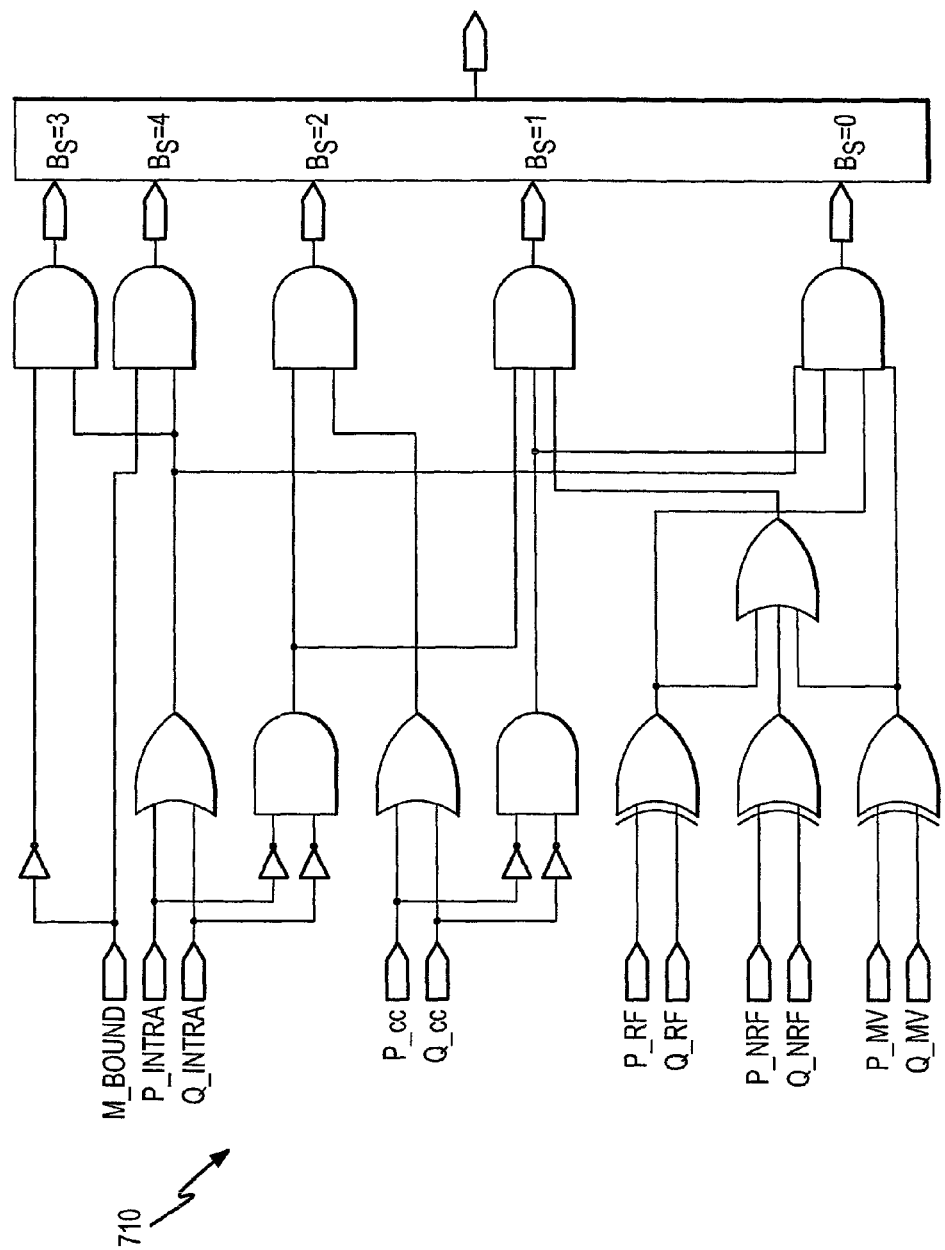
FIG. 7 illustrates an exemplary architecture for a boundary strength unit of the present invention, such as may be used in the deblocking filter of FIG. 6.

FIG. 7 illustrates a boundary strength unit 710 that may be used to implement the boundary strength unit 680 of FIG. 6. The boundary strength unit 710 as illustrated is designed to calculate or determine the boundary strength Bs of a particular edge, such as a particular vertical or horizontal edge of a macroblock in input 612 of FIG. 6. The Bs parameter is computed based on information from the macroblock header. In the illustrated Bs unit 710, the Bs parameter is computed in 3 clock cycles, and the determined Bs parameter is fed to the selectors 628, 638 of the two filtering units 620, 630 for use in selection of the filtering mode 622, 632, 624, 634, 626, 636 based on the H.264 deblocking filtering algorithm. The input signals of the unit 710 are defined as follow:

| Signal | Description |
| --- | --- |
| M_BOUND | Boundary is MB boundary |
| P_INTRA | P block is intra coded |
| Q_INTRA | Q block is intra coded |
| P_cc | P block contains coded coefficients |
| Q_cc | Q block contains coded coefficients |
| P_RF | P block is the reference frame |
| Q_RF | Q block is the reference frame |
| P_NRF | P block is not the reference frame |
| Q_NRF | Q block is not the reference frame |
| P_MV | P block contains motion vectors |
| Q_MV | Q block contains motion vectors |

Figure 8:
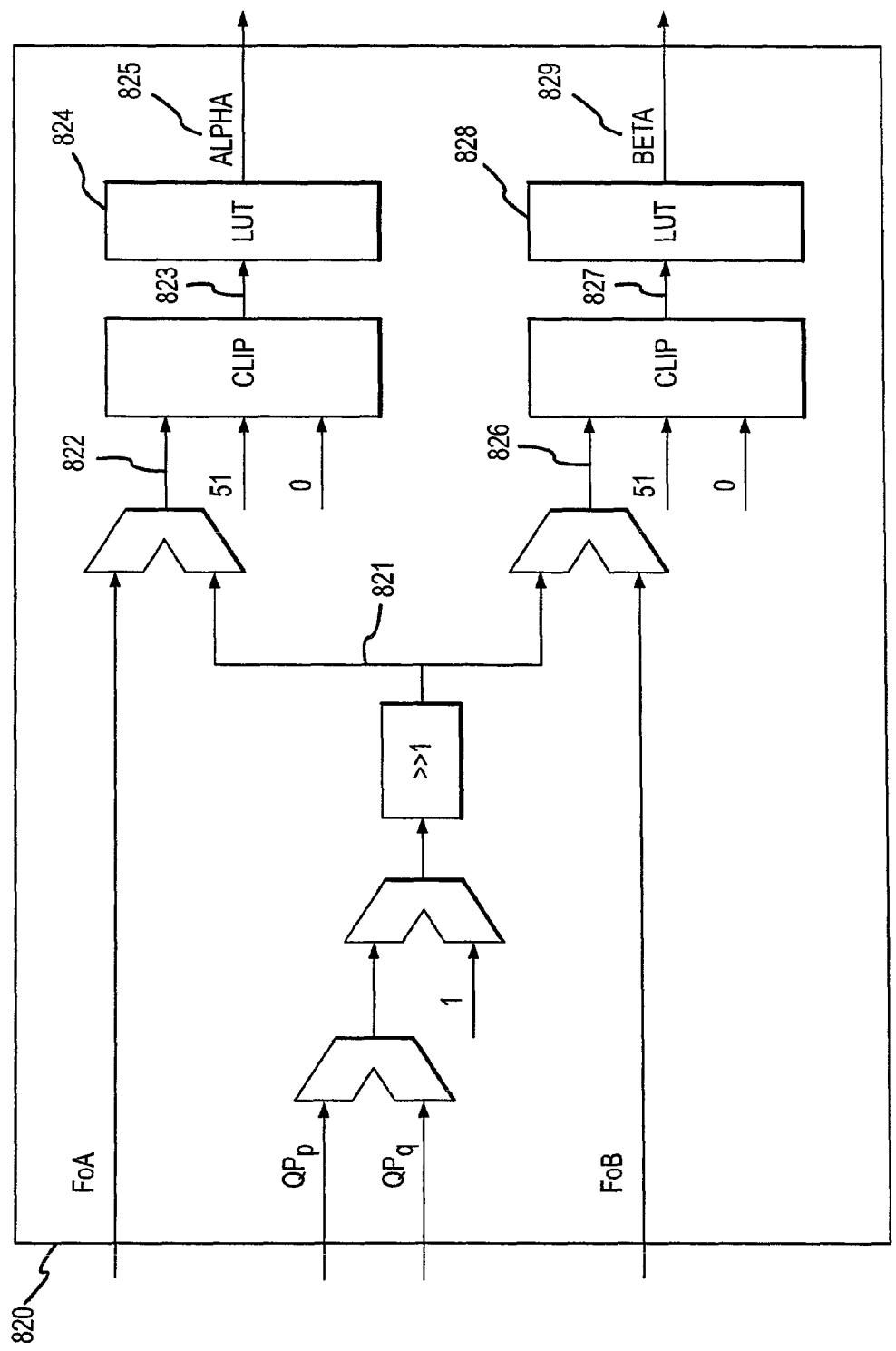
FIG. 8 illustrates an alpha-beta generator, such as may be used in the deblocking filter of FIG. 6.

FIG. 8 illustrates an alpha-beta generator or module 820 according to one embodiment of the invention that may be used as module 670 of deblocking filter 610. As shown, the module 820 receives as input (such as from control unit 660) the quantization parameters, $QP_p$ and $QP_q$, and filter offset indices, FoA and FoB. The module 820 processes these inputs and outputs two parameters, alpha and beta, that are then provided to the control unit of a DBF, such as CU 660 of filter 610, to select appropriate filters in filtering units 620, 630 for each block and sample. As can be seen from FIG. 8, the model 820 first calculates the average quantization parameter 821 from quantization parameters $QP_p$ and $QP_q$. The average quantization parameter 821 is added with filter offset FoA to generate an index 822. The index 822 is then clipped to produce a new index 823. New index 823 is used to select the threshold a 825 from the look-up table 824. Similarly, the average quantization parameter 821 is added with filter offset FoB to generate an index 826. The index 826 is then clipped to produce a new index 827. New index 827 is used to select the threshold β 829 from the look-up table 828.

Figure 9A:
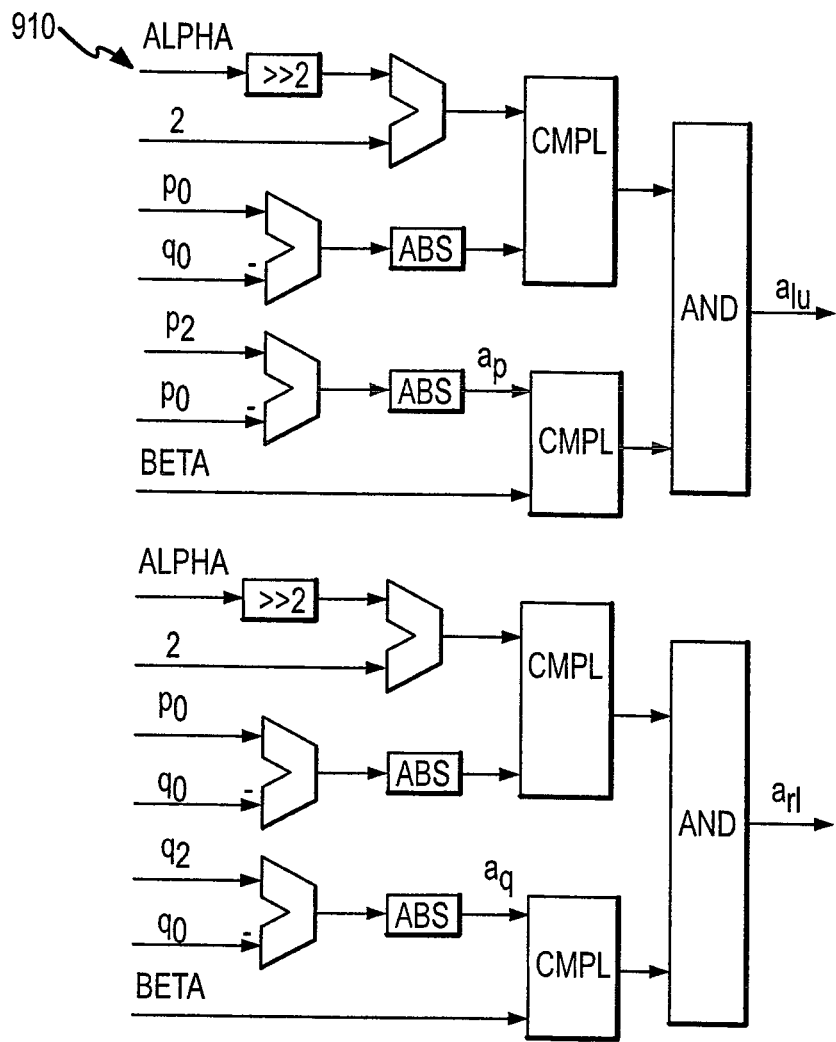
FIGS. 9A-9C show subunits of a control unit of the present invention, such as may be used for the control unit of deblocking filter of FIG. 6, with each subunit providing a subset of the guard conditions for a predication technique of the invention.
Figure 9B:
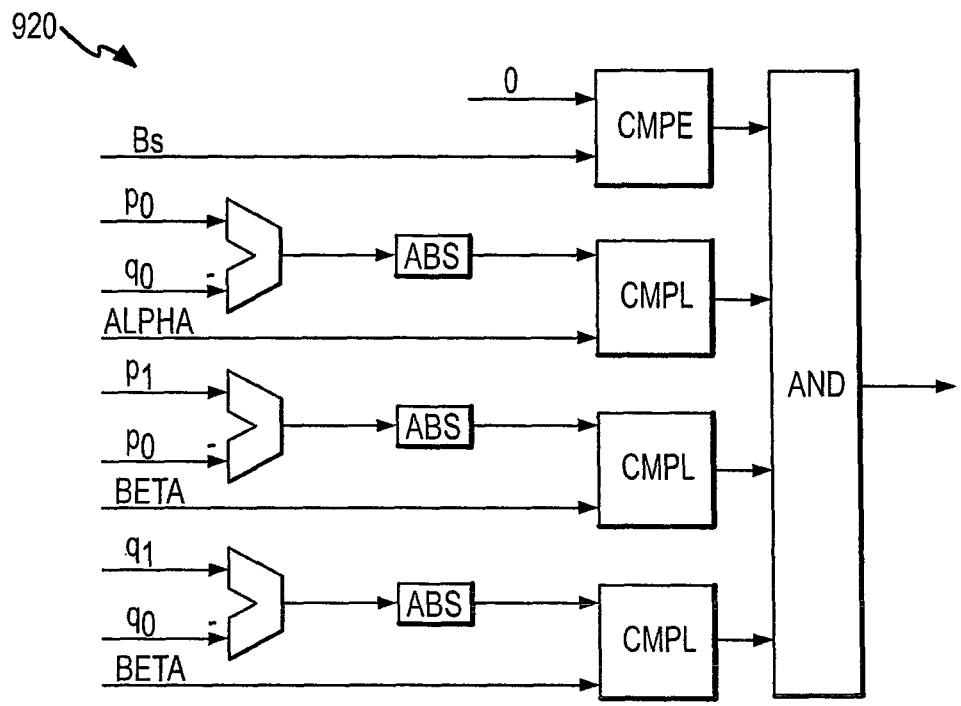
Figure 9C:
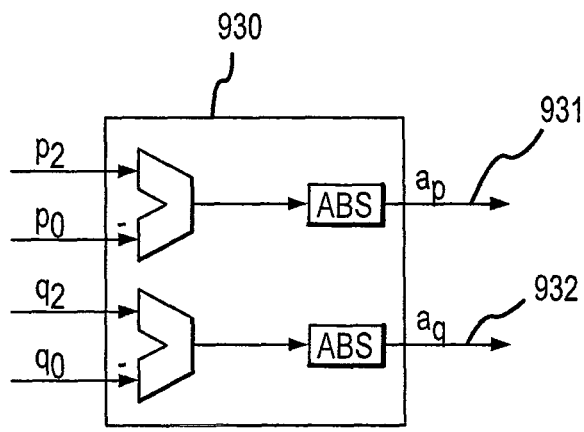

The control unit 660 of deblocking filter 610 is used to compute the branch conditions for the DBF 610. To this end, FIGS. 9A-9C illustrate subunits within an exemplary implementation of a control unit 660 that are each used to determine the branch conditions using predication. More specifically, subunit 910 of FIG. 9A is configured to used the alpha and beta parameters from the AB module 670 (or unit 820) along with other video input 640 and threshold variables $a_p$ and $a_q$ from 930 to determine guard conditions $a_{lu}$ and $a_{rl}$ for strong filters. If $a_p$ is set, long tap filters are used to calculate P0, P1 and P2. Otherwise, P2=p2, P1=p1, and 3-tap filter is used to calculate P0. Similarly, when $a_q$ is set, long tap filters are used to calculate Q0, Q1 and Q2. Otherwise, Q2=q2, Q1=q1, and 3-tap filter is used to calculate Q0 1010. Subunit 920 of FIG. 9B uses video input 640 along with the Bs parameter from the Bs unit 680 to determine guard conditions for use in making the edge blocking decision. When the output of 920 is set, it indicates that the video input samples must be filtered. The control unit 660 may also include a subunit 930 as shown in FIG. 9C. Subunit 930 uses video inputs 640 to calculate threshold variables $a_p=|p_2-p_0|$ and $a_q=|g_2-g_0|$, which are used for determining guard conditions for extended luna samples. These variables are used in subunit 910. With these examples, the longest latency of the control unit is 5 cycles.

During operation, the no filtering units 624, 634 are selected in the filtering units 620, 630 when the Bs parameter has a value of zero. When the Bs parameter indicates the edge or boundary is a weak edge with a Bs value of 1, 2, or 3, the weak edge unit 626, 636 of the horizontal or vertical filtering unit 620, 630 is selected. When the edge or boundary is a strong edge as shown by a Bs value of 4, the strong edge unit 622, 632 of the appropriate filtering unit 620, 630 is selected.

Figure 10:
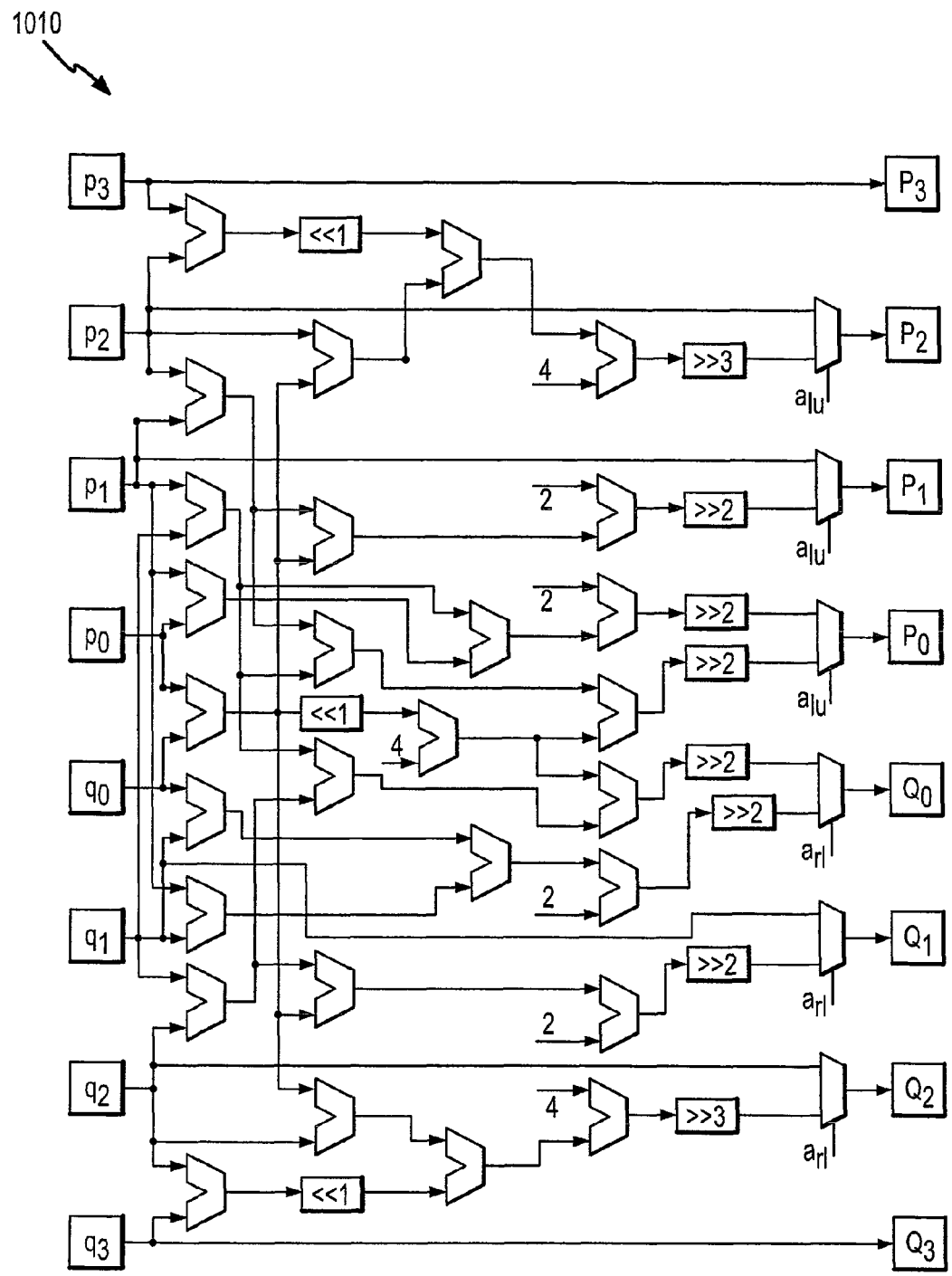
FIG. 10 illustrates an exemplary architecture for implementing a strong edge deblocking unit (SEDU) according to the invention and as may be used within the filtering units of deblocking processor of FIG. 6.
Figure 11:
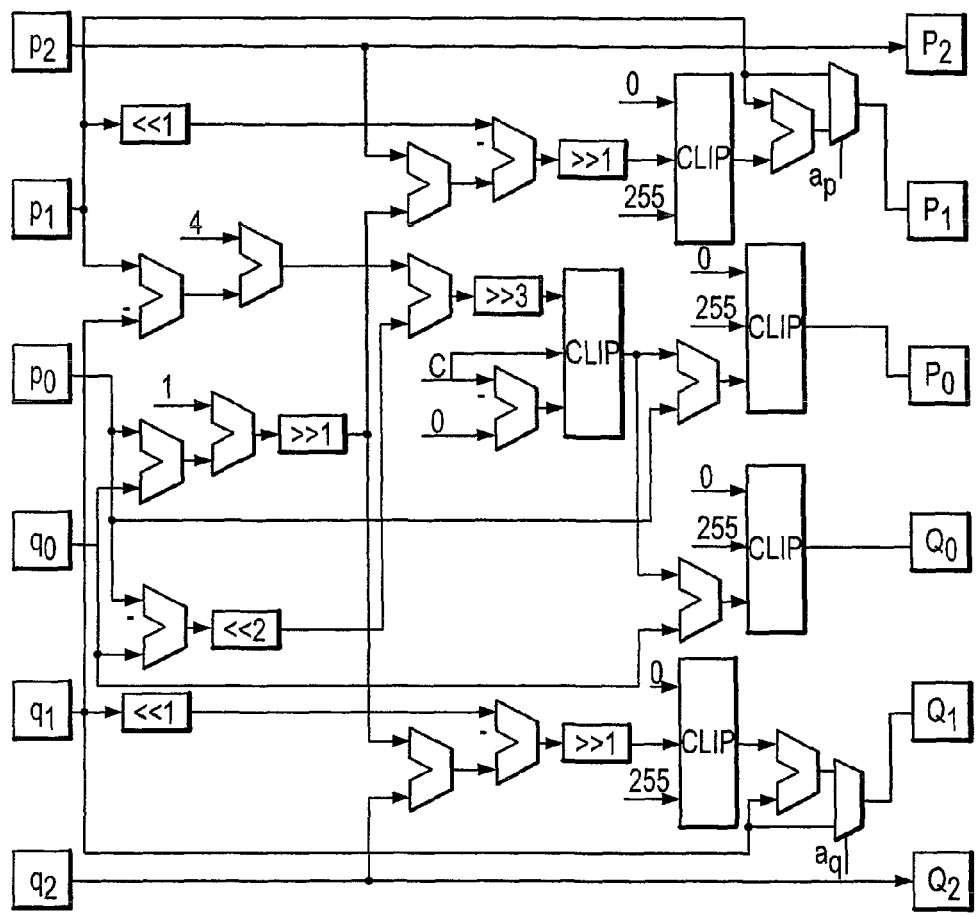
FIG. 11 illustrates an exemplary architecture for implementing a weak edge deblocking unit (WEDU) according to the invention and as may be used within the filtering units of deblocking processor of FIG. 6.

FIG. 10 illustrates a pipelined architecture of one implementation of strong edge deblocking unit (SEDU) 1010 that may be used for SEDUs 622, 632. The SEDU 1010 as shown performs deblocking filtering for edges with a boundary strength of 4 with a pipeline configuration divided into 6 stages. As a result, it takes the DBF 610 incorporating the SEDU 1010 nine clock cycles to filter a 4×4 block edge. As shown, the SEDU 1010 includes 28 adders, 11 shifters, 6 multiplexers, and thirty-two 16-bit registers. FIG. 11 illustrates a pipelined architecture of a weak edge deblocking unit (WEDU) 1130 that may be used to implement WEDUs 626, 636 of DBF 610 of FIG. 6. This unit 1130 is used or selected to filter edges with boundary strength Bs of 1, 2, or 3. The pipeline of WEDU 1130 is divided into 6 stages with it taking 9 clock cycles to filter a 4×4 block edge. The WEDU 1130 as shown includes 15 adders/substractors, 7 shifters, 2 multiplexers, 6 clip units, and forty-two 16-bit registers to achieve its functionality.

Operation of a deblocking filter, such as filter 610, may be further understood with a description of a time table or step-by-step description of how the filter can be used in a deblocking process. The following table shows a timeline for one proposed pipeline deblocking filter process of the invention and refers to the macroblock 210 shown in FIG. 2. As shown, the deblocking filter process involves concurrent operations and processing with up to four processes or operations being performed by the VLIW coprocessor with each step of the DBF process. As shown, the DBF processor loads luma samples and proceeds with filtering the first five vertical edges with the horizontal filter, with loading of samples continuing during filtering operations. After filtering of these first five vertical edges, the processor processes both vertical and horizontal edges concurrently with use of the horizontal and vertical filter units. Filtered samples are stored after completion of vertical and horizontal filtering, and such storing operations are performed concurrently with loading and filtering operations as shown in the table to further improve the efficiency of the DBF process and DBF throughput.

Performance Analysis

| STEP | Load | Load | Horizontal Filter | Vertical Filter | Store |
|---|---|---|---|---|---|
| 1 | $B_{i,j}$ | $b_{i-1,j}$ | | | |
| 2 | $B_{i,j+1}$ | $B_{i-1,j+1}$ | $V_0$ | | |
| 3 | $B_{i,j+2}$ | $B_{i-1,j+2}$ | $V_1$ | | |
| 4 | $B_{i,j+3}$ | $B_{i-1,j+3}$ | $V_2$ | | |
| 5 | $B_{i+1,j}$ | $B_{i+1,j}$ | $V_3$ | | |
| 6 | $B_{i+1,j+1}$ | $B_{i,j-1}$ | $V_4$ | | |
| 7 | $B_{i+1,j+2}$ | $Cr_{i,j}$ | $V_5$ | $H_0$ | |
| 8 | $B_{i+1,j+3}$ | | $V_6$ | $H_1$ | $B_{i,j}$ |
| 9 | $B_{i+2,j}$ | | $V_7$ | $H_2$ | $B_{i,j+1}$ |
| 10 | $B_{i+2,j+1}$ | | $V_8$ | $H_3$ | $B_{i,j+2}$ |
| 11 | $B_{i+2,j+2}$ | | $V_9$ | $H_4$ | $B_{i,j+3}$ |
| 12 | $B_{i+2,j+3}$ | | $V_{10}$ | $H_5$ | $B_{i+1,j}$ |
| 13 | $B_{i+3,j}$ | | $V_{11}$ | $H_6$ | $B_{i+1,j+1}$ |
| 14 | $B_{i+3,j+1}$ | | $V_{12}$ | $H_7$ | $B_{i+1,j+2}$ |
| 15 | $B_{i+3,j+2}$ | | $V_{13}$ | $H_8$ | $B_{i+1,j+3}$ |
| 16 | $B_{i+3,j+3}$ | | $V_{14}$ | $H_9$ | $B_{i+2,j}$ |
| 17 | | $Cr_{i-1,j}$ | $V_{15}$ | $H_{10}$ | $B_{i+2,j+1}$ |
| 18 | $Cr_{i,j+1}$ | $Cr_{i+1,j}$ | | $H_{11}$ | $B_{i+2,j+2}$ |
| 19 | $Cr_{i-1,j+1}$ | $Cr_{i+1,j+1}$ | | $H_{12}$ | $B_{i+2,j+3}$ |
| 20 | $Cr_{i,j-1}$ | | $CrV_0$ | $H_{13}$ | $B_{i+3,j}$ |
| 21 | $Cr_{i+1,j-1}$ | | $CrV_1$ | $H_{14}$ | $B_{i+3,j+1}$ |
| 22 | | $Cb_{i,j}$ | $CrV_2$ | $H_{15}$ | $B_{i+3,j+2}$ |
| 23 | $Cb_{i-1,j+1}$ | $Cb_{i-1,j}$ | $CrV_3$ | | $B_{i+3,j+3}$ |
| 24 | $Cb_{i,j-1}$ | $Cb_{i,j+1}$ | $CbV_0$ | $CrH_0$ | |
| 25 | $Cb_{i+1,j-1}$ | $Cb_{i+1,j}$ | $CbV_1$ | $CrH_1$ | $Cr_{i,j}$ |
| 26 | $Cb_{i+1,j+1}$ | | $CbV_2$ | $CrH_2$ | $Cr_{i,j+1}$ |
| 27 | | | $CbV_3$ | $CrH_3$ | $Cr_{i+1,j}$ |
| 28 | | | | $CbH_0$ | $Cr_{i+1,j+1}$ |
| 29 | | | | $CbH_1$ | $Cr_{i,j}$ |
| 30 | | | | $CbH_2$ | $Cr_{i,j+1}$ |
| 31 | | | | $CbH_3$ | $Cr_{i+1,j}$ |
| 32 | | | | | $Cr_{i+1,j+1}$ |

Vertical edges and horizontal edges are processed in parallel via operation of the horizontal and vertical filtering units until all vertical edges are filtered. Chroma samples are loaded during the calculation or filtering of the remaining luma horizontal edges (which is completed by before step 23). Such loading allows the DBF process to continue with filtering of the vertical and horizontal edges with the horizontal and vertical filtering units during the completion of filtering of the final luma horizontal edges. Processing continues in parallel, as shown in the table, for the chroma samples with the last edge being filtered in step 31 and then stored in step 32. In this example, all filtering calculations and operations take 288 clock cycles of a VLIW processor implementing the DBF method. As can be seen from the steps shown in the table, it takes 32 steps to complete the deblocking process for a macroblock.

The DBF implementation described above presents an efficient architecture (such as a VLSI architecture) for fast implementation of an in-loop deblocking filter for H.264 video compression. The described DBF method is particularly suited for implementation in the VLIW processor architecture such that performance is accelerated through the use of both data parallelism and a pipelined architecture. The proposed coprocessor can calculate the in-loop deblocking filter for a macroblock in 210 clock cycles, and this performance is well suited for portable devices that run at low clock rates to save power. The proposed DBF method and DBF processor configuration can also readily be scaled to run at higher speeds to meet requirements of HDTV, digital TV applications, and the like, which have larger frames and run at high frame rates.

During preliminary performance analysis, it is estimated that for the 4-CIF video format the DBF processor can run at 14 MHz to achieve desired results including a frame rate of 30 fps, number of macroblocks per frame of 1584, number of macroblocks to be processed per second of 47,520, and clock cycles 13,685,760. For the 16:9 video format at a similar frame rate of 30 fps, the DBF processor would be run at 320 MHz to provide analysis results including a number of macroblocks per frame of 36,864, number of macroblocks to be processed per second 1,105,920, and clock cycles of 318,504,960.

The above disclosure sets forth a number of embodiments of the present invention. Other arrangements or embodiments, not precisely set forth, could be practiced under the teachings of the present invention and as set forth in the following claims. From the above description, it can be seen that the invention presents an efficient architecture to implement the in-loop deblocking filter for H.264 video compression. The described deblocking filter is based on a video processor implemented using the VLIW architecture, pipelined processing, and predication techniques. The video processor or coprocessor can achieve high performance at a low clock rate. In one proposed embodiment, the video processor is modeled in C/C++ and SystemC programming language. The vector registers are provided in 512 bytes of memory, and the coprocessor can complete the deblocking for a macroblock in 210 clock cycles. For the 16 CIF (1408×1152) format, which contains 6,336 macroblocks per frame, it may take the coprocessor 39,916,800 cycles to complete the deblocking process for a second of video at 30 fps, and the deblocking or video processor can run at 40 MHz to meet this requirement.

I claim:

1. A parallel deblocking filtering method for removing edge or boundary artifacts created during video compression, comprising:

with a deblocking filter processor, loading a set of luma samples for a macroblock; filtering a set of first edges of the macroblock using information in the loaded set of luma samples, wherein the filtering of the first edges is performed at least partially concurrently with the loading of the set of luma samples;

filtering a set of second edges of the macroblock using information in the loaded set of luma samples, wherein the filtering of the second edges is performed at least partially concurrently with the filtering of the first edges; and storing results of the first filtering and second filtering, wherein the storing is performed at least partially concurrently with some loading operations as well as the filtering operations, wherein the set of luma samples of the macroblock is accessed from a set of vector registers adapted to hold two-dimensional data; and wherein the filtering of the second edges is performed at least partially concurrently with the filtering of the first edges for a second edge using only luma samples used previously in the filtering of one or more first edges.

2. The filtering method of claim 1, wherein the filtering of the first edges is performed by the second filtering unit and the filtering of the second edges is performed by the first filtering unit, wherein the second and first filtering units operate concurrently to perform the filtering steps.

3. The filtering method of claim 2, wherein the second and first filtering units each comprise a no filtering unit applying no filtering to an edge of the macroblock, a strong edge deblocking unit applying a strong filtering mode to an edge of the macroblock, and a weak edge deblocking unit applying a weak filtering mode to an edge of the macroblock, further comprising selecting the no filtering unit, the strong edge deblocking unit, or the weak edge deblocking unit for use in the filtering of the first and the second edges based on a boundary strength of a particular edge of the macroblock.

4. The filtering method of claim 1, further comprising determining the boundary strength of each of the first and the second edges of the macroblock.

5. The filtering method of claim 1, wherein the loading comprises operating the deblocking filter processor to load two of the luma samples concurrently.

6. The filtering method of claim 1, further comprising with the deblocking filter processor loading a set of chroma samples for the macroblock, wherein the loading of the chroma samples is performed at least partially concurrently with the filtering of the first edges and with the filtering of the second edges.

7. The filtering method of claim 6, further comprising filtering first edges of the chroma samples at least partially concurrently with the filtering of the second edges of the luma samples and filtering second edges of the chroma samples at least partially concurrently with the filtering of the first edges of the chroma samples.

8. The filtering method of claim 1, further comprising operating the deblocking filter processor to store a filtered luma sample, wherein the storing is performed concurrently with the loading of the luma samples, the filtering of first edges of the luma samples, and filtering of second edges of the luma samples.

9. The filtering method of claim 1, wherein the luma samples comprise 4×4 blocks and the loading of the set of luma samples comprises loading corresponding the 4×4 blocks into the vector registers provided in the deblocking filter processor for use in the filtering of the edges.

10. The filtering method of claim 1, wherein the filtering of the first and second edges comprises processing to the deblocking filtering algorithm defined by the H.264 video compression standard.

11. A deblocking processor for implementing deblocking filtering under the H.264/AVC video compression standard, comprising:
a set of vector registers adapted to hold two-dimensional data for storing blocks of a macroblock in a memory;
a first filtering unit for filtering first edges of the blocks of the macroblock;
a second filtering unit for filtering second edges of the blocks of the macroblock; and
a storing unit for storing results of the first filtering and second filtering;
wherein the storing unit performs at least partially concurrently to filter the second edges and the first edges of the blocks,
wherein the first and second filtering units operate at least partially concurrently to filter the second edges and the first edges of the blocks to complete the deblocking filtering with parallel processing, and wherein
the filtering of a second edge uses only luma samples used previously in the filtering of one or more first edges.

12. The deblocking processor of claim 11, wherein each of the first and second filtering units comprise a no filtering unit, a strong edge deblocking unit, a weak edge deblocking unit, and a selector for selecting the no filtering unit, the strong edge deblocking unit, or the weak edge deblocking unit for processing each of the edges based on a value of a boundary strength parameter associated with each of the edges.

13. The deblocking processor of claim 12, further comprising a boundary strength unit determining the value of the boundary strength of each of the edges based on information in a header of the macroblock and providing the determined values to the selectors.

14. The deblocking processor of claim 12, comprising a very long instruction word (VLIW) processor operating to perform the storing of the blocks in the vector registers, the filtering of the first edges with the first filtering unit, and the filtering of the second edges at least partially concurrently.

15. The deblocking processor of claim 14, further comprising a control unit performing a plurality of branch conditions based on information associated with the blocks of the macroblock to determine a plurality of guard conditions, wherein the control unit provides a subset of the guard conditions as input to the strong edge deblocking units for use in filtering strong edges.

16. The deblocking processor of claim 14, wherein the VLIW processor operates to store a first set of the blocks after the filtering of the first and second edges in system memory accessible to the deblocking filter, the storing of the blocks being performed at least partially concurrently with the filtering of the first and second edges of a second set of the blocks.

17. The method of claim 1, wherein filtering the set of first edges and filtering the set of second edges comprise:
filtering the left-most first edges and the next left-most top first edge;
filtering a next second edge starting with the top left-most second edge going under and then to the right concurrently with filtering a next first edge starting with the first edge under the next left-most top first edge going under and then to the right iteratively until all first edges are filtered; and
filtering the remainder of the second edges.

18. The method of claim 17, wherein filtering the set of first edges and filtering the set of second edges comprise:
for an edge number n,
for $0=n<5$, deblocking first edges;
for $5 \leq n \leq 15$, concurrent deblocking first edges and second edges; and
for $11 \leq n \leq 15$, deblocking second edges.

19. The deblocking processor of claim 11, wherein filtering the second edges and the first edges comprise:
filtering the left-most first edges and the next left-most top first edge;
filtering a next second edge starting with the top left-most second edge going under and then to the right concurrently with filtering a next first edge starting with the first edge under the next left-most top first edge going under and then to the right iteratively until all first edges are filtered; and
filtering the remainder of the second edges.

20. The method of claim 19, wherein filtering the second edges and the first edges comprises:
for an edge number n,
for $0=n<5$, deblocking first edges;
for $5 \leq n \leq 15$, concurrent deblocking first edges and second edges; and
for $11 \leq n \leq 15$, deblocking second edges.

21. The method of claim 1, wherein filtering the set of first edges comprises filtering a set of vertical edges.

22. The method of claim 1, wherein filtering the set of first edges comprises filtering a set of horizontal edges.

23. The method of claim 1, wherein filtering the set of second edges comprises filtering a set of horizontal edges.

24. The method of claim 1, wherein filtering the set of second edges comprises filtering a set of vertical edges.

25. The processor of claim 11, wherein filtering the first edges comprises filtering vertical edges.

26. The processor of claim 11, wherein filtering the first edges comprises filtering horizontal edges.

27. The processor of claim 11, wherein filtering the second edges comprises filtering horizontal edges.

28. The processor of claim 11, wherein filtering the second edges comprises filtering vertical edges.

* * * * *

UNITED STATES PATENT AND TRADEMARK OFFICE
CERTIFICATE OF CORRECTION

PATENT NO. : 8,537,895 B2
APPLICATION NO. : 13/350119
DATED : September 17, 2013
INVENTOR(S) : Dang Page 1 of 1

It is certified that error appears in the above-identified patent and that said Letters Patent is hereby corrected as shown below:

In the Claims

Column 18, line 38, Claim 18 "$5 \leqq n \leqq 15$" should be --$5 \leq n \leq 15$--

Column 18, line 40, Claim 18 "$11 \leqq n \leqq 15$" should be --$11 \leq n \leq 15$--

Column 18, line 56, Claim 20 "$5 \leqq n \leqq 15$" should be --$5 \leq n \leq 15$--

Column 18, line 58, Claim 20 "$11 \leqq n \leqq 15$" should be --$11 \leq n \leq 15$--

Signed and Sealed this
Nineteenth Day of November, 2013

Teresa Stanek Rea
*Deputy Director of the United States Patent and Trademark Office*